Oct. 15, 1968   L. S. LERNER   3,406,385
INTRUDER DETECTION SYSTEM
Filed Aug. 16, 1965   4 Sheets-Sheet 1

Oct. 15, 1968

L. S. LERNER

3,406,385

INTRUDER DETECTION SYSTEM

Filed Aug. 16, 1965

INVENTOR.
LAWRENCE S. LERNER,
BY J. K. Haskell
ATTORNEY.

United States Patent Office 3,406,385
Patented Oct. 15, 1968

3,406,385
INTRUDER DETECTION SYSTEM
Lawrence S. Lerner, Santa Monica, Calif., assignor to Hughes Aircraft Company, Culver City, Calif., a corporation of Delaware
Filed Aug. 16, 1965, Ser. No. 479,960
13 Claims. (Cl. 340—258)

ABSTRACT OF THE DISCLOSURE

A system for detecting the presence of intruders in an area under surveillance including a source of acoustic signals and a gated receiving network adapted to receive acoustic signals during a predetermined interval subsequent to the generation of said signals for the purpose of determining the ambient reverberation time of said area and for detecting deviations from said ambient reverberation time which are caused by the presence of intruders.

---

This invention relates broadly to a protective alarm system and, more particularly, to an improved system for detecting the presence of an intruder in a protected space.

Several intruder detection systems have been proposed for automatically producing a signal when an intruder is present in an area or space which is to be protected from intrusion. One such system fills a space to be protected with signals of a given comparatively high frequency or frequencies. Motion within the space is detected by comparing the frequency of received signals with the frequency of the transmitted signals and sensing any frequency shift due to such motion. Such frequency shift is well known as the Doppler shift. As became apparent to the inventor, the system is extremely sensitive to motion produced by any source in the protected area and not only that created by an intruder and therefore results in the production of many false alarm signals.

Attempts have been made to inhibit the system from producing false alarm signals due to the motion produced by some nonintruder sources, such as air turbulence which produces moving air currents in the space to be protected. Indeed, a highly complex system has been proposed to discriminate turbulent air and other effects from intruders in an intruder detection system based on the Doppler shift phenomenon.

Other sys'ems which have been proposed employ continuous wave (cw) techniques whereby a transmitter continuously introduces signals of a fixed highly stable frequency into the protected space. A receiver which is also continuously in operation receives the transmitted signals directly from the transmitter as well as signals reflected from the walls of the protected space. These signals are then analyzed to sense small changes in the received signals produced by the presence of an intruder. Since the receiver and transmitter are simultaneously in operation, it is submitted that the response of the receiver is mostly affected by the continuously and directly transmitted signals so that any effect of an intruder will only produce a small change on top of a relatively large steady state condition. Thus, in order to be practicable, the proposed systems include elaborate and complex circuitry to detect such minor variations.

In prior art systems, the signal changes may be greatly affected by the relative position of an intruder in the protected space. An intruder standing in the direct path between the transmitter and receiver may affect the system to a much larger degree than one standing in a position where the signals directly received by the receiver from the transmitter are hardly disturbed. Furthermore, most prior art systems produce false alarm signals due to any sudden changes in the protected space caused by motion of any of the fixtures therein, such as moving machinery. Also, some systems are dependent on close coupling between the transmitter and the space. Since coupling can best be achieved at lower frequencies, such systems must generally operate in the sonic or audible frequency range, and therefore are easily discoverable by one attempting to enter the protected space.

In addition to the above-described disadvantages, some of the prior art systems are based on standing wave pattern techniques which are extremely sensitive to frequency changes, changes in the arrangements in the protected space, as well as environmental condition changes such as humidity and temperature. Consequently, prior art systems despite their complexity and cost, are quite sensitive to changes produced by any one of many sources, in addition to that caused by an intruder, and therefore often produce false alarm signals. Attempts to reduce the sensitivity of the systems to nonintruder sources have not been successful since, by reducing the sensitivity, the system often fails to produce the desired alarm signals when an intruder enters the space to be protected.

Accordingly, it is an object of the present invention to provide a novel intruder detection system.

Another object is to provide an intruder detection system which is relatively insensitive to changes in operable conditions.

A further object is the provision of a system for automatically detecting the presence of an intruder in a space to be protected by detecting changes produced by an intruder in the reverberation time of the space to be protected.

Yet another object of the invention is to provide a novel system for detecting the presence of an intruder in a protected space which is relatively less complex and expensive than prior art systems.

A further object is the provision of a new intruder detection system which is substantially insensitive to changes in the protected area occurring during a predetermined relatively short time interval and therefore does not produce false alarm signals which are typical of prior art systems.

Another object of the invention is to provide a reliable detection system for providing one or more signals indicative of the presence of an intruder and/or the occurrence of specific phenomena in the protected space.

Still a further object is to provide a new intruder detection system which is not materially affected to sudden changes in its operating conditions such as line power fluctuations and other causes which occur during a predetermined relatively short time interval.

These and other objects of the invention are achieved by providing a system in which signals of a selected frequency, such as sound signals, are radiated into a space to be protected during successive time intervals which are spaced from one another by a predetermined time period. The frequency may be in the sonic or ultrasonic range and may vary within predetermined limits without affecting the accuracy of the system. Also, the principles of the invention are applicable to other types of signals, such as electromagnetic radiation. The signals introduced during each transmitting interval are continuously reflected by the walls and objects in the protected space so that the signal level at a predetermined period $\Delta t$ after each transmitting interval is related to the signal absorption characteristics of the space which is in turn related to the reverberation time of the protected space. Any given point in the space will possess a characteristic signal level at the period $\Delta t$ after each transmitting interval.

In the system of the present invention, the signals present in the space during each receiving interval, which occurs $\Delta t$ seconds after each transmitting interval, are integrated in an integrator to produce an output, the level of which is related to the reverberation time of the space. Any intruder present, or object placed in the space, or changes in the environmental conditions therein, affects the absorption of signals in the space and therefore the reverberation time. Since the rate and magnitude of the change in signal absorption will vary, depending on the intruder or object which is introduced into the space and/or the phenomenon occurring therein, the novel system is adjustable to sense the rate of change of the output level of the integrator and to provide an output alarm signal only when that rate of change corresponds to a change in the space's reverberation time which is assumed to be produced by a particular source, such as an intruder, from which the space is to be protected. By utilizing the signals in the space at a time $\Delta t$ after signals are introduced therein, it is made certain that the received signals are produced by multiple reflections which tend to reduce the effect of direct or almost direct signal propagation between the transmitter and receiver. Consequently, the sensitivity of the system to an intruder in any part of the space is greatly increased.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figures 1, 5:
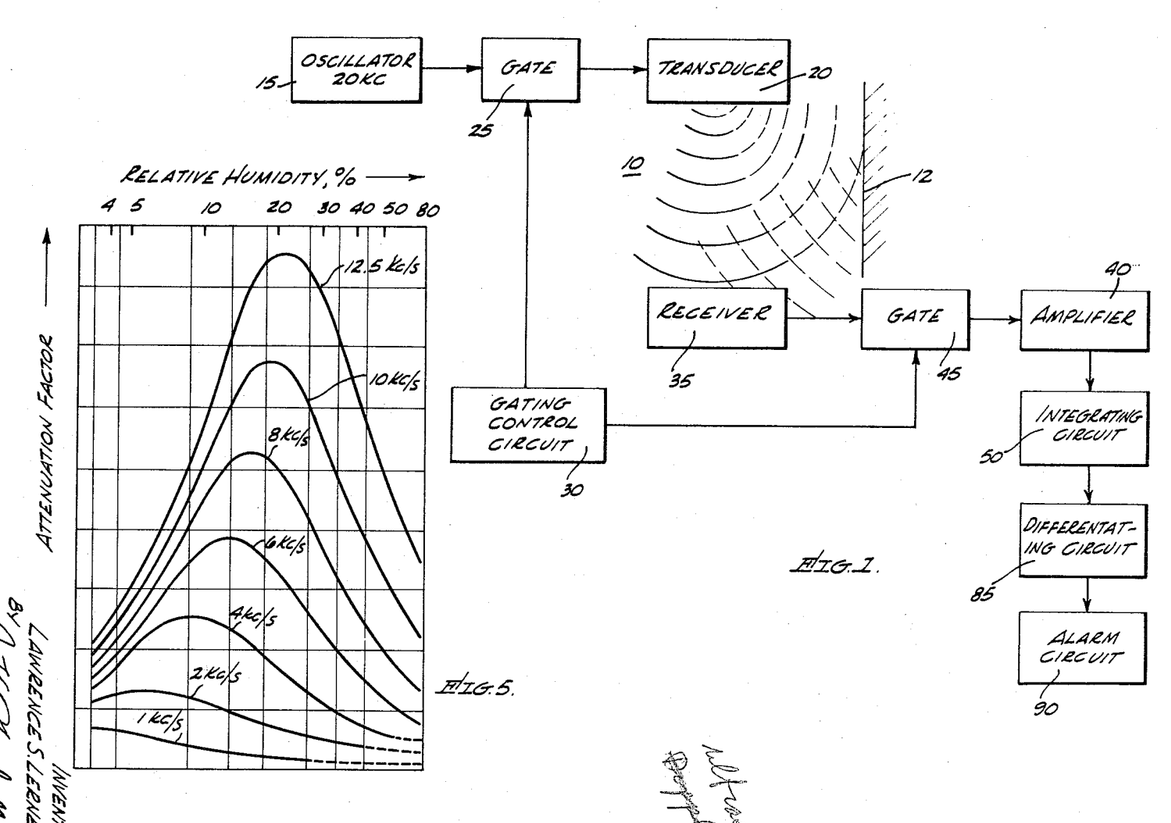
FIGURE 1 is a block diagram of the novel intruder detection system of the present invention.
FIGURE 5 is a graph of attenuation factor versus relative humidity of air at different frequencies for explaining the operation of FIGURE 4.

Attention is now directed to FIGURE 1 which is a block diagram of the novel system of the present invention for detecting the presence of an intruder in a space which is to be protected from intrusion, such as a room 10. The principle of operation of the system is based on sensing changes in the characteristic reverberation time of the protected space.

The invention will first be described in conjunction with room 10 which is assumed to be enclosed, and therefore will also be referred to as the enclosed space, having walls 12. However, as will be apparent from the following description, the teachings of the invention are applicable to protect any space or object from intrusion, whether the space is enclosed or not, as long as the protected space has a characteristic reverberation time which is subject to change by an intruder. It is the intention that the term intruder be construed in its broadest sense to include, in addition to a person, intruding animals and/or any object or phenomena which may affect the characteristic reverberation time of the space which is to be protected.

Figure 2:
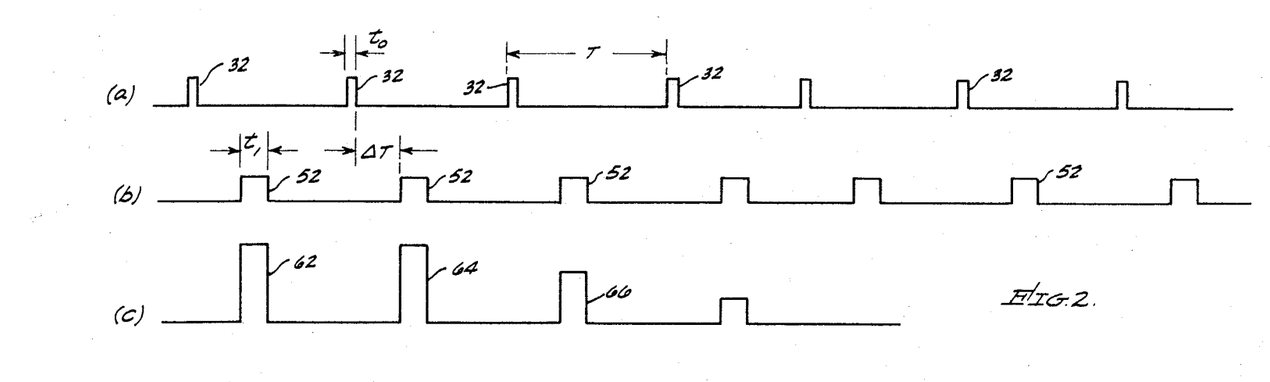
FIGURE 2 is a diagram of waveforms useful in explaining the operation of the system of FIGURE 1.

The system includes an oscillator 15 which supplies signals to a transducer 20 through a gate 25, the signals having a frequency which is preferably, but not necessarily, in the ultrasonic region, such as 20 kilocycles (kc.). The gate 25 is controlled by a gating control circuit 30 to supply the signals from oscillator 15 to transducer 20 only during successive transmitting intervals having a selected repetition rate. As diagrammed in FIGURE 2(a) to which reference is made herein, each transmitting interval 32 is of a duration $t_0$, while the repetition rate or the period between intervals is designated by the letter T.

Preferably, $t_0$ is only a small fraction (such as $\frac{1}{50}$) of the period T, so that the supply of signals to the transducer 20 is in the form of signal bursts or pulses rather than a continuous supply of the output of oscillator 15. For example, $t_0$ and T may be selected to be 20 milliseconds (ms.) and one second respectively so that a burst of 20 kc. signals of a duration of 20 ms. is supplied to the transducer 20, once every second.

The transducer 20 introduces or radiates the signals supplied thereto into the room 10 so that the signals propagate in all directions. Some of the signals propagate directly toward receiver 35 while others are reflected by the walls 12. Thus, sound produced by the signals in the room 10 persists even after direct reception from the source has stopped, such a phenomenon being known as reverberation.

As is known by those familiar with the art, the term reverberation time is usually defined as the time required for the reverberant sound produced by a signal of a given frequency to decrease to one millionth of its initial intensity. Thus, in the present system wherein bursts of 20 kc. signals during each of $t_0$ time intervals are introduced into the room 10, the room, in the absence of any intruder, will possess a characteristic reverberation time. This time is directly related to the room's volume and indirectly related to the room's absorption characteristic which is a function of the surface area of each object therein, multiplied by the object's absorption coefficient. Thus, for a given size room, its reverberation time decreases when a sound-absorbing object is introduced into the room. This is the case when a human intruder enters the room. Generally, the body and the conventional clothes of a person have relatively high absorption coefficients, so that as the person enters a room, some of the sound is absorbed by him and therefore the reverberation time of the room changes from whatever value it had prior to the person's presence. It is these changes in the reverberation time of a room to be protected that the present system is designed to detect in order to produce an alarm signal indicative of the intruder's presence.

Referring again to FIGURE 1, there is shown the receiver 35 coupled to an amplifier 40 through a gate 45 which is controlled by circuit 30. The output of the amplifier is supplied to an integrating circuit, hereafter also referred to as integrator, 50. The gate 45 is enabled by the gating control circuit 30 during a receiving interval 52 of $t_1$ duration which is delayed from each transmitting interval 32 by a selected time delay $\Delta t$. The receiving intervals 52 and the time delay $\Delta t$ are diagrammed in FIGURE 2(b) to which reference is made herein. Thus, it is seen that the signals supplied to the amplifier 40 correspond to the sound level in the room $\Delta t$ seconds after each of the transmitting intervals during which 20 kc. signals are introduced into the room.

The value of $\Delta t$, i.e. the time delay, is chosen as a function of the characteristic reverberation time of the particular room in the absence of an intruder. The duration $t_1$ of each receiving interval is selected to insure that the signals supplied to amplifier 40 during each receiving interval are representative of the sound level in the room $\Delta t$ seconds after each transmitting interval, where $\Delta t$ may be a fraction of a second. In one example, $t_1$ has been chosen to equal 0.1 second. From the foregoing, it is appreciated that as long as the reverberation time of the room is not changed, the signals supplied to amplifier 40 during successive receiving intervals 52 [FIGURE 2, line (b)] will be of equal amplitude as diagrammed in FIGURE 2, line (c) by pulses 62 and 64 which are shown to be of equal height. However, when a sound-absorbing object, such as an intruder, enters the room, the reverberation time decreases and therefore the amplitude of the signals supplied to amplifier 40 decreases as diagrammed by pulse 66 which is of smaller height than pulses 62 and 64. Thus, any change in the reverberation time of the room is reflected by a change in the amplitude of the signals supplied to amplifier 40.

The output of the amplifier 40 is connected to the integrator 50 having a time constant $T_c$ which, in one example, has been chosen to equal 10T periods. Although, at every instant, the output level of the integrator represents the weighted average amplitude of all the signals received by amplifier 40, the output level is mostly a function of the signals received during a time $T_c$. Thus, the output level may be thought of as being a function of the signals received during a time interval on the order of $T_c$. Since the signals received during a time interval on the order of $T_c$ are related to the reverberation time in the room or space during the same interval, the output level of the integrator is a function of the average reverberation time of the space during a time interval on the order of $T_c$. As long as the reverberation time remains relatively constant, the output of the integrating circuit 50 will remain at a constant level. However, as the reverberation time changes for appreciable time periods as compared with the time constant $T_c$ of the integrator, the output level of the integrator will change. If the reverberation time decreases abruptly from one value to another, the output level of the integrator will decrease from one level to another, approximately 0.67 of the total change occurring during a time equal to $T_c$.

Figure 3:
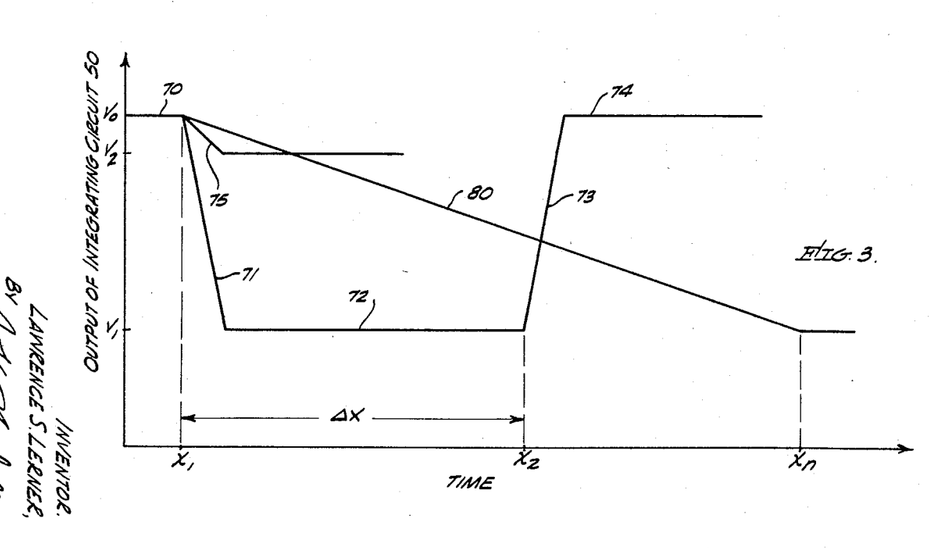
FIGURE 3 is a diagram of integrator output level versus time.

For a better understanding of the operation and function of the integrating circuit 50, reference is made to FIGURE 3 which is a diagram in which the level of the integrator's output is diagrammed along the abscissa. Let us assume that after the system is turned on, an intruder is not present in the room 10. Then, from the foregoing, it should be appreciated that the room has a given reverberation time so that equal amplitude pulses, such as 62 and 64, are supplied to the amplifier 40. This in turn causes the integrator 50 to provide an output with a nearly constant level $V_0$ represented by line 70. The reverberation time in the absence of an intruder can be thought of as the ambient reverberation time and therefore the level $V_0$ may be defined as the ambient level. It is appreciated that the actual value or magnitude of $V_0$ is a function of $\Delta t$ with respect to the actual reverberation time of the room, the duration $t_1$ of each receiving interval during which the signals are supplied to amplifier 40, the actual amplitude of the 20 kc. signals from the oscillator and other circuit parameters, such as transducer efficiency. However, irrespective of these values, for the ambient reverberation time of any room, the integrator 50 will produce an ambient level $V_0$.

As long as the room's ambient reverberation time is not disturbed or changed for a period which is appreciable with respect to the time constant $T_c$, the output level of integrator 50 will remain at $V_0$. As previously assumed, $T_c = 10T$. If the room's ambient reverberation time is affected for a short period, such as for one or more seconds, due to a minor disturbance in the room, such as a blowing curtain or any other fixture, only the amplitudes of a few of the pulses supplied to amplifier 40 will change slightly. However, the output level of integrator 50 which averages out the amplitudes of the previously received pulses, will remain substantially the same at $V_0$. Let us assume that at time $X_1$, an intruder enters the room and remains there until at least a time $X_2$ where $X_2 - X_1 = \Delta X$ which is much greater than the time constant of the integrator $T_c$.

The presence of the intruder increases the sound absorption in the room which in turn reduces the reverberation time so that the amplitudes of the pulses supplied to amplifier 40 [see FIGURE 2(c)] decrease. Consequently, the output level of integrator 50 drops from level $V_0$ to a level $V_1$, designated by horizontal line 72. Level $V_1$ is assumed to represent the level of the integrator 50 in response to signals received from the room 10 with a specific intruder present therein. It should be appreciated by those familiar with the art that the actual change in levels is asymptotic, rather than abrupt changes as diagrammed in FIGURE 3 for explanatory purposes only. Furthermore, it should be appreciated that during the time constant $T_c$, only approximately 0.67 of the total change in output level occurs. If at time $X_2$ the intruder leaves the room, the reverberation time of the room will again equal its ambient reverberation time, so that the output level of the integrator will rise from level $V_1$ to level $V_0$ as indicated by lines 73 and 74. For explanatory purposes, let it be assumed that the change in output level of integrator 50 from $V_0$ to $V_1$ is caused by the presence of a human intruder in room 10.

If instead of a human intruder, an object or small animal, which absorbs less sound than a human being, is placed in the room, the ambient reverberation time will also be affected. However, since the small animal does not absorb as much sound (or signal) as a human being, the change in the room's reverberation time will be less, so that the output level of integrator 50 will change by a smaller amount. The smaller change is diagrammed in FIGURE 3 by level $V_2$. Line 75 represents the change in output level of integrator 50 from $V_0$ to $V_2$ produced by the introduction into the room of an object which absorbs less sound than a human being and and therefore affects the room's reverberation time to a lesser degree.

The reverberation time, in addition to being affected by a human intruder and/or objects placed in the room, may also be affected by various phenomena such as humidity changes which affect the sound absorption characteristic of the room. Line 80 in FIGURE 3 is assumed to represent a change in the output level of the integrator 50 which may occur due to a continuous change in the room's reverberation time occurring from time $X_1$ to a time $X_n$ due to changes in environmental conditions. Since such changes are quite gradual, the time rate of change of the reverberation time is small and therefore the time rate of change of the output level represented by the slope of line 80 is quite small. Hereafter, for simplicity, the time rate of change of either the reverberation time or the output level, will be simply referred to as the rate of change. It is to be understood that the rate of change of the output level is only the same as the rate of change of the reverberation time when the latter rate is within the limits of the integrator time constant.

For explanatory purposes, the change in the output level of integrator 50 produced by changes in the environmental conditions (line 80) from a level $V_0$ to $V_1$ is shown to be the same as the change produced by a human intruder. However, it is appreciated that the rate of level change is different. In the case of the human intruder, the change occurs in a time $T_c$, which is the integrator's time constant, while in the case of the environmental condition changes, the changes occur between time $X_1$ and $X_n$ which is assumed to be very long compared with $T_c$. Thus, by sensing the rate of change of the output level of integrator 50, a particular type intruder or phenomenon introduced into the room to be protected can be detected.

The detection is accomplished by a differentiating circuit 85 which responds to the output of the integrating circuit 50. The circuit 85 may include a level setting circuit as well known in the art, so as to develop an output signal only when the input signal change exceeds a predetermined level. The circuit 85 with a time constant $T_d$, which is generally equal to or smaller than $T_c$, continuously senses the output level of integrator 40 to provide an output signal only when the rate of change of the output level of the integrator is equal to or greater than a predetermined value. Alternatively, the operation of circuit 85 may be defined as comparing the output level of integrator 50 at a given instant with the output level at a prior selected time, to provide an output alarm signal only when the difference in the levels exceeds a predetermined value.

The differentiating circuit 85 may be adjusted so that an output signal is produced only when the rate of change of the integrator output level corresponds to that produced by the entrance of an intruding human being as represented by the slope of line 71. Thus, even though the output level of the integrator 50 may change when objects which absorb less sound than a human being are placed in the room, the circuit 85 will nevertheless produce an output alarm signal only when a human being enters the room. The output alarm signal of the latter circuit may be connected to trigger an alarm circuit 90. It may also be supplied to a remote monitoring panel to indicate the presence of an intruder in the room.

Although in most applications it is desired to protect rooms such as bank vaults, workshops and rooms containing secret documents from human intruders, it is appreciated that by properly controlling the setting of the differentiating circuit 85, the sensitivity of the system may be changed to provide an alarm output signal in response to any desired rate of change of the output level of integrator 50. Thus, if a room is to be protected from objects which change the output level of the integrating 50 from $V_0$ to $V_2$, the sensitivity of circuit 85 may be adjusted to produce an output signal when the rate of change of the output level corresponds to line 75.

From the foregoing, it should be appreciated that the system of the present invention, by being adjustable to produce an alarming signal only in response to a particular intruding phenomena, differs from the presently known detection systems. For example, the system based on the Doppler shift is sensitive to nearly any moving object in the protected space, whether or not the object is introduced into the room or is a fixture, such as lamp or curtains, which are moved by accident, or machinery which is normally in motion. Similarly, systems which employ standing wave pattern techniques are sensitive to anything which may disturb the wave pattern, including changes in environmental conditions.

In addition to the aforementioned advantages of the system of the present invention, the necessity of controlling the frequency of the transmitted signals to a high degree of accuracy, which is characteristic of nearly all systems based on the Doppler shift phenomenon and/or standing wave patterns, is substantially eliminated. Since the present invention responds to changes in the reverberation time of the room to be protected and since reverberation time of a space, such as a room, is usually not a strong function of the sound frequency, no elaborate precautions need be taken to stabilize the frequency of oscillator 15 (FIGURE 1). Therefore a conventional relatively inexpensive oscillator can be used. Similarly, the receiver can be a relatively simple device with a narrow reception band which will depend on the maximum allowable change in the oscillator's frequency. If the system is to operate in spaces with very high ambient noise levels, it may be advantageous to stabilize the oscillator's frequency, and employ a sharp bandpass filter (not shown) between gate 45 and amplifier 40 to eliminate any effect of the noise on the output level of integrating circuit 50.

The effect of extraneous noise on the system may also be minmized by supplying the output of amplifier 40 to a phase sensitive detector (not shown) which includes an integrator as an integral part, such as a boxcar detector. A reference signal is also supplied to the detector from a phase adjuster (not shown) which is connected to the oscillator 15. Thus, the detector will produce an output only as a function of received signals which are in proper phase relationship with respect to the transmitted signals. Since noise is of random phase, it will generally be discriminated by the phase sensitive detector so that the output will generally not be a function of noise.

The gating control circuit 30 may comprise a motor with a pair of cams positioned on its shaft, with the cams actuating switches to enable gates 25 and 45 as herebefore described. Any other known technique may be employed to enable the gates in the sequences and the durations described in conjunction with FIGURE 2, lines (a) and (b). Similarly, integrating and differentiating circuits 50 and 85 may be constructed to perform their respective functions with presently known circuitry techniques without great expense. Thus, the entire system is relatively inexpensive as compared with the cost of the presently known systems which employ very precise instruments which must operate with a high degree of stability in order for the systems to fulfill their function.

In addition, since the present invention responds to changes in the reverberation time, it is not necessary to precisely set the sensitivities or levels of the various instruments, such as the oscillator 15, amplifier 40, and integrator 50. Furthermore, the system of the present invention need not be reset or readjusted if the contents of the protected space is changed from time to time. The requirement for such readjustments is particularly significant in systems which are based on standing wave pattern techniques.

In light of the foregoing description, it should be appreciated that the novel system is based on detecting the presence of an intruder, in an enclosed space or room to be protected, by sensing the changes in the room's reverberation time. At any given time, the room's reverberation time is represented by the output level of the integrating circuit 50 of a time constant $T_c$, so that changes in its level correspond to changes in reverberation time. The output level represents the integrated signals received during previous receiving intervals. Consequently, any momentary change in the reverberation time occurring, for example during one or two periods, will not affect the output level to any significant degree. As a result, the system is not affected by momentary changes in the reverberation time which occur during periods which are short with respect to the integrator's time constant. This prevents the system from providing false alarm output signals due to such occurrences as a moving fixture, such as a falling lamp, in the protected room. Also, since the system is based on detecting changes in reverberation time, the system can be employed to operate in spaces with moving machinery. Once an ambient reverbation time is established, any changes therefrom are detectable.

The output of the integrating circuit 50 is analyzed in differentiating circuit 85 to provide an alarming output signal only when the output level of the integrator changes by a predetermined amount within a time which equals the circuit's time constant $T_d$. Thus the system does not produce an alarm output signal when the change in reverberation time is gradual and over a long time period, such as the change represented by line 80 in FIGURE 3.

Although in FIGURE 1, the integrating circuit 50 is shown connected to a single differentiating circuit 85, the integrator may be directly coupled to several differentiating circuits, each with its characteristic time constant. For example, one may be set with a short time constant, such as to provide an alarm output signal when an intruder enters the room represented by the lines 71 and 72 in FIGURE 3, while another circuit, with a time constant $n \times T_d$, where $n$ is greater than one, may be set to provide an output signal in response to a very gradual change in the reverberation time occurring over a long time period such as that represented by line 80. Thus, the novel system of the invention may provide more than one alarm output signal, each one being indicative of a different rate of change of the room's reverberation time, as represented by the different slopes of lines 71, 75 and 80 in FIGURE 3. The differentiating circuit 85 is therefore assumed to represent one or more differentiating circuits, each with its unique time constant.

In the foregoing description, it has been assumed that changes in environmental conditions in the space to be protected are quite gradual and therefore the changes in the reverberation time resulting from such changing conditions can be easily distinguished from those produced by an intruder. This assumption is valid in most cases. However, situations may arise where severe changes in environmental conditions, particularly humidity, in a relatively short time period may affect the reverberation time to an extent which may be confused with a change produced by an intruder resulting in a false alarm signal.

Figure 4:
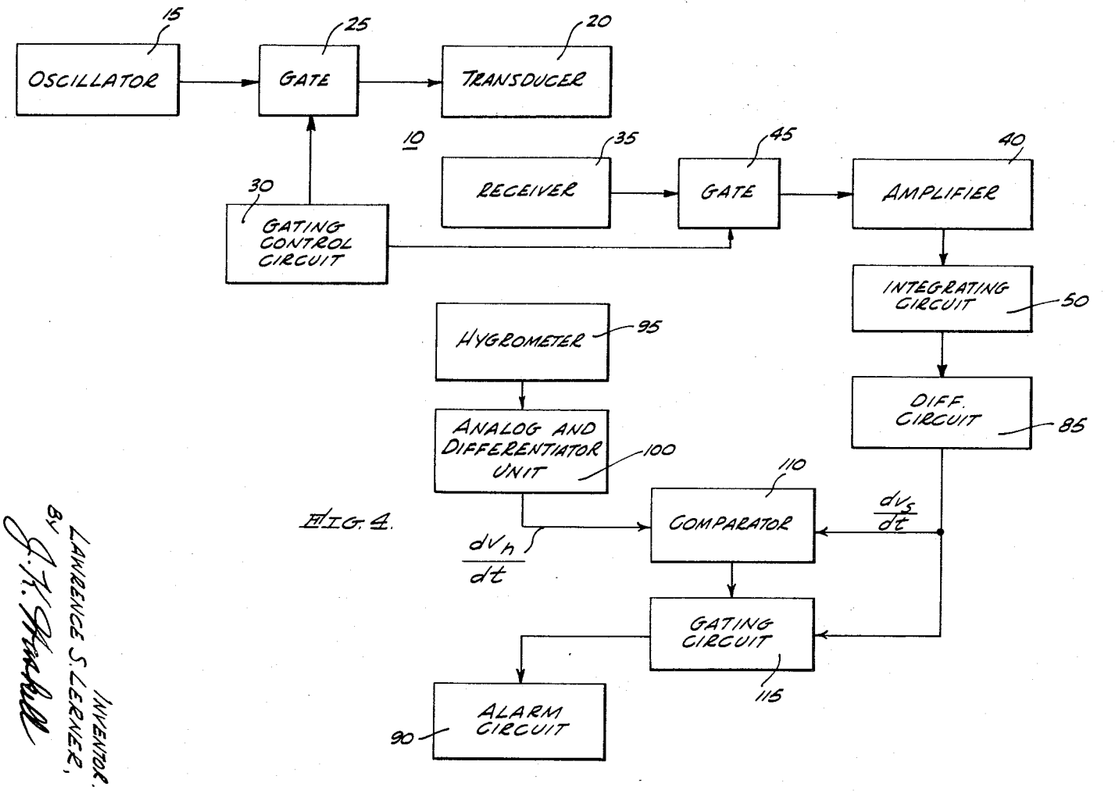
FIGURE 4 is a block diagram of another embodiment of the invention.

To prevent this from occurring, the present invention includes another embodiment which is diagrammed in FIGURE 4 to which reference is made herein. As is appreciated by those familiar with the art, the effect of humidity on sound waves is a function of the frequency of the waves. Generally, it may be stated that at a given humidity, sound waves of a higher frequency are attenuated to a greater degree. Also, at any given frequency, the attenuation varies as a function of humidity. Reference is made to FIGURE 5 which diagrammatically represents the effect of humidity on the attenuation characteristics of sound waves of different frequencies. For example, attenuation of sound waves of 12.5 kilocycles per second (kc./s.) increases as the relative humidity rises from 0 to approximately 25%. Thereafter, the attenuation decreases as the relative humidity increases above 25%.

These characteristics are utilized in the embodiment shown in FIGURE 4. The embodiment includes a hygrometer 95 which is placed in the room 10 to measure the relative humidity therein. Assuming that the frequency of oscillator 15 is 12.5 kc./s., the output of hygrometer 95 is coupled to an analog and differentiator unit 100, the output of which is a voltage rate $dV_n/dt$, which is at all times related to the humidity in the room and the effect thereof on sound waves of 12.5 kc./s. Thus, from FIGURE 5, it is apparent that the output of unit 100 is a minimum when the humidity is 25% and increases as the humidity varies from this value. The unit 100 may be implemented with a servo motor which is responsive to the output of hygrometer 95. The motor may be coupled to a cam which moves an arm of a potentiometer, so that the output voltage of the unit 100 follows the desired functional relationship. Similarly, any other function generating technique may be employed.

The output voltage $dV_n/dt$ of unit 100 is supplied together with the output voltage rate $dV_s/dt$ of differentiating circuit 85 to a comparator 110. It is appreciated that the output voltage of circuit 85 is affected by the attenuation of the sound waves passing from transducer 20 to receiver 35. Therefore, the output voltage is also a function of the humidity in the room 10. In practice, the analog unit 100 is calibrated so that for any given humidity value, the voltage rates $dV_n/dt$ and $dV_s/dt$ are equal, so that the output of comparator 110 does not activate a gating circuit 115 to enable the output of differentiating circuit 85 to be supplied to the alarm circuit 90.

As long as the change in the output voltage rate $dV_s/dt$ of circuit 85 is due only to a change in humidity in room 10, the output voltage rate $dV_n/dt$ of unit 100 changes by an equal amount. Therefore, irrespective of the change in humidity, or the rate of change thereof, gating circuit 115 will remain deactivated so that the alarm circuit 90 cannot be activated. However, when the voltage rate $dV_s/dt$ changes, the change being due not only to changes in humidity, but also due to other sound attenuating factors in the room 10, such as an intruder, the voltage rates supplied to comparator 110 will no longer be equal. Therefore, comparator 110 will activate gating circuit 115, so that if the rate of change of $dV_s/dt$ is equal or greater than a predetermined value, indicative of an intruder, a signal will be supplied to alarm circuit 90. Thus, in the embodiment of FIGURE 4, even when the humidity in room 10 changes quite abruptly, the system does not produce an alarm signal. Only when an intruder enters, is alarm circuit 90 activated by signals from differentiating circuit 85.

Figure 6:
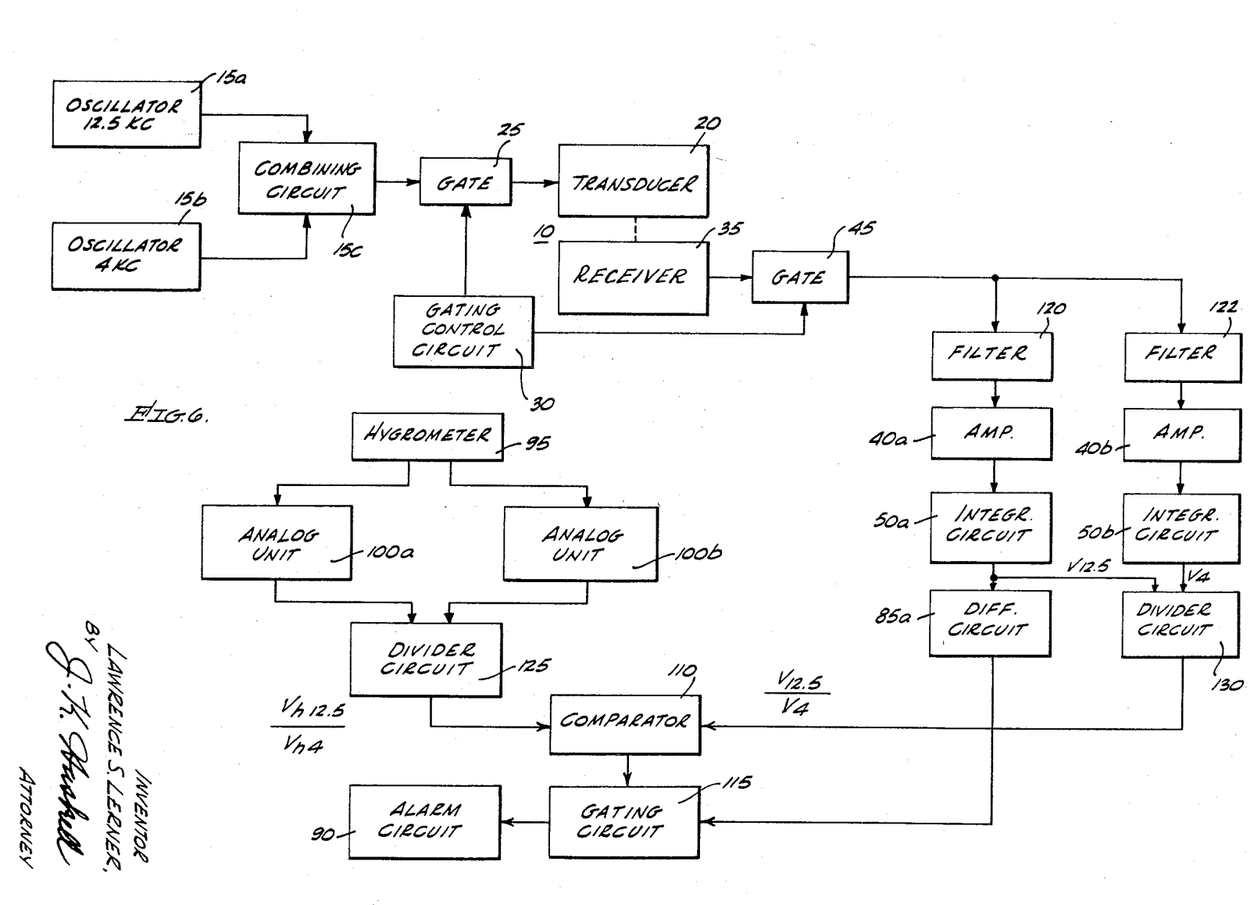
FIGURE 6 is a block diagram of another embodiment of the invention.

The principles of operation of the embodiment of the invention shown in FIGURE 4 may be expanded and employed in another embodiment of the invention which is diagrammed in FIGURE 6 and to which reference is made herein. In this embodiment, a pair of oscillators 15a and 15b are used to provide signals at two different frequencies which, for explanatory purposes only, are assumed to be 12.5 kc./s. and 4 kc./s. respectively, but which could be any pair of frequencies in the sonic or ultrasonic range. The signals are combined in a combining or impedance matching circuit 15c and therefrom they are supplied to transducer 20 through gate 25, as hereinbefore described. After being received by receiver 35 and passed through gate 45, the signals are supplied to filters 120 and 122. Filter 120 passes only the 12.5 kc./s. signals to an amplifier 40a, which is connected to an integrating circuit 50a, whose output is supplied to a differentiating circuit 85a. Similarly, filter 122 passes only the 4 kc./s. signals to an amplifier 40b which is connected to an integrating circuit 50b.

In addition, the system includes the hydgrometer 95 which is connected to two analog units 100a and 100b which are similar to unit 100, herebefore described. Unit 100a produces an output voltage $V_{h12.5}$ which is related to the humidity in the room 10 and its attenuating effect on signals at 12.5 kc./s. Similarly, unit 100b provides an output voltage $V_{h4}$ which is related to the room's humidity and its attenuating effect on signals at 4 kc./s. The two voltages are then divided in a divider circuit 125 to provide an output voltage $V_{h12.5}/V_{h4}$ which is a function of the room's humidity and its effect on signals of the two different frequencies. The effect of humidity on such signals is shown in FIGURE 5 by the lines designated 12.5 kc./s. and 4 kc./s. respectively.

From the foregoing description of the embodiment of the invention shown in FIGURE 4, it should be appreciated that in the embodiment of FIGURE 6, the output voltages of integrating circuits 50a and 50b, designated as $V_{12.5}$ and $V_4$ are a function of the effect of the humidity in room 10 on signals of frequencies of 12.5 kc./s. and 4 kc./s. respectively. Output voltages $V_{12.5}$ and $V_4$ are supplied to another divider circuit 130 which provides an output representing the ratio of voltage $V_{12.5}$ to voltage $V_4$. This output, together with the output of circuit 125, are supplied to the comparator 110.

As long as the change in sound or signal attenuation in the room 10 is caused by changes in humidity, the two voltages supplied to comparator 110 will change by equal ratios. Thus, comparator 110 will not activate gating circuit 115. However, when an intruder enters the room, the voltage from divider circuit 130 will change so that the ratio of the two voltages supplied to comparator 110 will no longer be constant. Consequently, gating circuit 115 will be activated to enable the output of differentiating circuit 85a to trigger the alarm circuit 90.

From the foregoing, it should be appreciated that the embodiments of the invention diagrammed in FIGURES 4 and 6 are quite similar, performing similar functions and operating on similar principles. It should be appreciated that the selection of the detection system to be used greatly depends on the maximum rate of humidity change to be expected, the smallest intruder-induced change in reverberation time which is to be detected, and the integrator's time constant.

In the foregoing, the invention has been described in conjunction with an enclosed space, such as a room, wherein the presence of an intruder absorbs sound and therefore reduces the reverberation time. However, in some situations, the presence of an intruder may increase the reverberation time. For example, in a shed with open sides, the reverberation time is very short since the only sound-reflecting surfaces are the roof and the floor. However, an intruder effectively adds surface from which sound is reflected, so that an increase in reverberation time may be experienced. The present invention is similarly applicable to such situations. The output level of the integrator will increase and the differentiating circuit may be set to sense the rate of increase of the integrator's output level. Therefore, the term, space, as used herein and in the appended claims, is intended to be construed to include either an enclosed or open space to be protected. The only requirement is that the space have a measurable reverberation time, so that changes produced by an intruder may be sensed.

Similarly, the term intruder should be construed to include any object as well as phenomena (environmental conditions) which have sound absorption characteristics so that when they are introduced into the space to be protected, they change the reverberation time thereof. It should be appreciated that those familiar with the art may make modifications in the arrangements as shown without departing from the spirit of the invention. Therefore, all such modifications or equivalents are deemed to fall within the scope of the appended claims.

What is claimed is:

1. A system for detecting an intruder in a space to be protected by sensing the rate of change in the reverberation time of said space relative to an ambient reverberation time value comprising:
   means for successively defining transmitting intervals spaced in time from one another by a period T, each transmitting interval having a duration $t_0$;
   means for defining a receiving interval subsequent to each of said transmitting intervals by a period $\Delta t$, each of said receiving intervals having a duration $t_1$;
   transmitting means for introducing signals of a predetermined frequency into said space during each of said transmitting intervals;
   a receiver positioned in said space for receiving signals therein;
   integrating means having a time constant $T_c$ for providing an output by integrating signals received by said receiver during said receiving intervals, the level of said output being a function of the reverberation time of said space, said integrating means providing an ambient output level when the reverberation time of said space equals the ambient reverberation time thereof; and
   output means for sensing the rate of change in the output level of said integrating means in a selected time interval and providing an output signal when said rate of change equals or is greater than a predetermined rate of change which corresponds to a change in the reverberation time of said space produced by the presence of said intruder in said space.

2. The system defined in claim 1 wherein the time constant $T_c$ of said integrating means is equal to $nT$, $n$ being greater than one to minimize the effect of a change in the reverberation time of said space occurring in a period T on the output level of said integrating means, said output level being a function of the average reverberation time of said space during a time interval on the order $nT$.

3. The system defined in claim 2 wherein said output means includes differentiating means having a time constant $T_d$ for providing said output signal when the rate of change of said output level of said integrating means is equal to or greater than a predetermined rate of change corresponding to the presence of a specified signal-absorbing object in the space to be protected.

4. A system for detecting the rate of change in the reverberation time of a protected space comprising:
   means for successively defining transmitting intervals spaced in time from one another by a period T, each transmitting interval having a duration $t_0$;
   means for defining a receiving interval subsequent to each of said transmitting intervals by a period $\Delta t$, each of said receiving intervals having a duration $t_1$;
   transmitting means for introducing signals of a predetermined frequency into said space during each of said transmitting intervals;
   a receiver positioned in said space for receiving signals therein;
   integrating means having a time constant $T_c$ responsive to the signals received by said receiver during said receiving intervals for providing an output having a level which is a function of the average reverberation time of said space during an interval of time having a duration on the order of $T_c$ whereby an ambient output level represents an ambient reverberation time of said space; and
   output means for detecting the rate of change in the output level of said integrating means said rate of change corresponding to changes in said reverberation time.

5. The system defined in claim 4 wherein the time constant $T_c$ of said integrating means is equal to $nT$, $n$ being greater than one to minimize the effect of a change in the reverberation time of said space occurring in a period T on the output level of said integrating means, said output level being a function of the average reverberation time of said space during a time interval on the order of $nT$.

6. System defined in claim 5 wherein said output means includes differentiating means having a time constant $T_d$ for providing an output signal only when the rate of change of said output level of said integrating means equals or exceeds a predetermined rate of change corresponding to the presence of a particular signal-absorbing object in the space to be protected.

7. A system for detecting the rate of change in the reverberation time of a space to be protected comprising:
   means for successively defining transmitting intervals spaced in time from one another by a period T, each transmitting interval having a duration $t_0$;
   means for defining a receiving interval subsequent to each of said transmitting intervals by a period $\Delta t$, each of said receiving intervals having a duration $t_1$;
   transmitting means for introducing signals of a predetermined frequency into said space during each of said transmitting intervals;
   a receiver positioned in said space for receiving signals therein;
   integrating means having a time constant $T_c$ for integrating signals received by said receiver during said receiving intervals and providing an output having a level which is a function of the reverberation time of said space; and
   output means responsive to the output of said integrating means for providing an output signal when the rate of change of the level of said output is equal to or greater than a predetermined rate of change which corresponds to a change in the reverberation time of said space produced by the presence of a predetermined signal-absorbing object in said space.

8. The system defined in claim 7 wherein the time constant $T_c$ of said integrating means is equal to $nT$, $n$ being greater than one to minimize the effect of a change in the reverberation time of said space occurring in a period T on the output level of said integrating means, said output level being a function of the average reverberation time of said space during a time interval on the order of $nT$.

9. A system for detecting the rate of change in the reverberation time of a space to be protected, comprising:
   means for successively defining transmitting intervals spaced in time from one another by a period T, each transmitting interval having a duration $t_0$;
   means for defining a receiving interval subsequent to each of said transmitting intervals by a period $\Delta t$, each of said receiving intervals having a duration $t_1$;
   transmitting means for introducing signals of a plurality of predetermined frequencies into said space during each of said transmitting intervals;

receiver means positioned in said space for receiving signals therein;

a plurality of integrating means each having a time $T_c$ for integrating signals of said plurality of predetermined frequencies received by said receiver during said receiving intervals and providing an output having a level which is a function of the reverberation time of said space;

means responsive to the plurality of outputs of said integrating means for providing a first composite signal as a function of the output levels of said plurality of integrating means;

sensing means positioned in said space for detecting the environmental conditions therein;

means responsive to said sensing means for providing a second composite signal as a function of the environmental conditions of said space and said plurality of frequencies;

comparing means for providing an output signal only when said first and second composite signals differ by a predetermined value; and output means responsive to the output of one of said plurality of integrating means for providing an alarm signal when the rate of change of said output is equal to or greater than a predetermined rate and said comparing means provides said output signal.

10. A system for detecting an intruder in a space to be protected by detecting changes in the reverberation time of said space produced by said intruder comprising:

means for successively defining transmitting intervals spaced in time from one another by a period T, each transmitting interval having a duration $t_0$;

means for defining a receiving interval subsequent to each of said transmitting intervals by a period $\Delta t$, each of said receiving intervals having a duration $t_1$;

transmitting means for introducing signals of first and second frequencies into said space during each of said transmitting intervals;

receiver means positioned in said space for receiving signals propagating therein;

first and second intergrating means for integrating signals of said first and second frequencies respectively received by said receiver means during said receiving intervals and for providing first and second outputs having levels which are related to the attenuation of said signals of first and second frequencies in said space;

means responsive to said first and second outputs for providing a first composite signal;

sensing means positioned in said space for detecting the humidity therein;

means for producing a second composite signal having an amplitude which is related to the effect of the humidity value in said space on signals of said first and second frequencies;

comparing means for providing an output signal only when said first and second composite signals differ by a predetermined value;

differentiating means for sensing the rate of change of either said first output or said second output and providing an alarm signal when said rate of change is equal to or greater than a predetermined value; and output means including a gating circuit responsive to said alarm signal for providing a signal indicative of the presence of an intruder only when said gating means is activated by the output signal of said comparing means.

11. The method of detecting the presence of an intruder in a protected space by detecting the rate of change in the ambient reverberation time of the space caused by said intruder, the steps comprising:

radiating into the protected space signals within a predetermined band of frequencies during each transmitting interval in a series of transmitting intervals;

measuring during a receiving interval the signal level in said space at a predetermined time after each transmitting interval;

combining the measured signals received during the receiving intervals to provide an output signal having a level related to the ambient reverberation time of said space;

sensing the rate of change of the level of said output signal caused by the absorption of signals in said protected space by objects introduced therein; and providing an alarm signal only when the rate of change of the level of said output signal is equal to or greater than a predetermined rate of change caused by the presence of an intruder in said protected space.

12. The method defined in claim 11 wherein the step of combining includes the step of integrating the measured signals received during the receiving intervals over a predetermined integration time spanning a plurality of said receiving intervals.

13. A system for detecting changes in the reverberation time of a space to be protected comprising:

means for successively defining transmitting intervals spaced in time from one another by a period T, each transmitting interval having a duration $t_0$;

means for defining a receiving interval subsequent to each of said transmitting intervals by a period $\Delta t$, each of said receiving intervals having a duration $t_1$;

transmitting means for introducing signals of a predetermined frequency into said space during each of said transmitting intervals;

a receiver positioned in said space for receiving signals therein;

means responsive to the signals received by said receiver during said receiving intervals for providing a first output which is a function of the changes in the reverberation time of said space and the environmental conditions therein;

sensing means for sensing the environmental conditions in said space;

means responsive to said sensing means for providing a second output which is related to the environmental conditions in said space and said predetermined frequency, said second output being substantially equal to said first output as long as said first output is affected only by changes in environmental conditions;

comparing means for providing an activating signal when said first and second outputs differ by a predetermined value; and output means including gating means for providing an alarm signal only when said first signal changes at a rate equal to or greater than a predetermined rate of change and said gating means is activated by the activating signal from said comparing means.

References Cited

UNITED STATES PATENTS

| | | | |
|---|---|---|---|
| 2,071,933 | 2/1937 | Miessner | 340—258 |
| 2,826,753 | 3/1958 | Chapin | 340—258 |
| 2,623,931 | 12/1952 | Bagno | 340—258 |
| 2,987,713 | 6/1961 | Bagno | 340—258 |
| 3,086,196 | 4/1963 | Sande. | |
| 3,193,823 | 7/1965 | Laakmann | 340—258 X |

JOHN W. CALDWELL, *Primary Examiner.*

D. L. TRAFTON, *Assistant Examiner.*